(12) United States Patent
Neogi

(10) Patent No.: US 6,483,851 B1
(45) Date of Patent: Nov. 19, 2002

(54) SYSTEM FOR NETWORK TRANSCODING OF MULTIMEDIA DATA FLOW

(75) Inventor: Raja Neogi, Portland, OR (US)

(73) Assignee: Tektronix, Inc., Beaverton, OR (US)

( * ) Notice: Subject to any disclaimer, the term of this patent is extended or adjusted under 35 U.S.C. 154(b) by 0 days.

(21) Appl. No.: 09/191,929

(22) Filed: Nov. 13, 1998

(51) Int. Cl.$^7$ .................................................. H04J 3/22
(52) U.S. Cl. ...................................... 370/466; 709/231
(58) Field of Search ............................... 370/229, 230, 370/231, 232, 235, 298, 300, 351, 395, 465; 709/200, 246, 232, 231

(56) References Cited

U.S. PATENT DOCUMENTS

| | | | |
|---|---|---|---|
| 5,724,355 A | * 3/1998 | Bruno et al. | 370/401 |
| 5,896,502 A | * 4/1999 | Shieh et al. | 395/200.54 |
| 5,918,013 A | * 6/1999 | Mighdoll et al. | 395/200.47 |
| 5,933,600 A | * 8/1999 | Shieh et al. | 395/200.49 |
| 5,996,002 A | * 11/1999 | Krueger et al. | 709/247 |
| 6,065,059 A | * 5/2000 | Shieh et al. | 709/233 |
| 6,073,168 A | * 6/2000 | Mighdoll et al. | 709/217 |

FOREIGN PATENT DOCUMENTS

WO    WO 98/43177    10/1998

OTHER PUBLICATIONS

Smith, J.R et al "Transcoding Internet content for heterogeneous client devices" Circuits and Systems, May 31–Jun. 3, 1998, vol. 3, pp. 599–602.*

E. Amir, S. McCanne, R. Katz, "An Active Service Framework and its Application to Real–time Multimedia Transcoding", University of California, Berkeley.

R. Sharma, S. Keshav, M. Wu, L. Wu, "Environments for Active Networks", 1997 IEEE.

"Architectural Framework for Active Networks" version 0.9 Active Networks Working Group, Aug. 31, 1998, Ken Calvert, Department of Computer Science, University of Kentucky.

"Active Networking and the End–to–End Argument", Samrat Bhattacharjee, Kenneth L. Calvert, Ellen W. Zegura, Georgia Institute of Technology.

"Building an Active Node on the Internet" by David M. Murphy May 27, 1997.

"QoS Filters: Addressing the Heterogeneity Gap", Nicholas Yeadon, Andreas Mauthe, Francisco Garcia and David Hutchison, Lancaster University, Mar. 4–6, 1996.

* cited by examiner

Primary Examiner—Hassan Kizou
Assistant Examiner—Anh-Vu H Ly
(74) Attorney, Agent, or Firm—Francis I. Gray; Jeremiah Baunach

(57) ABSTRACT

A service provider node has an active network daemon running on it. Users control an adaptive pipeline via the active network capability of the service provider node by sending coded instructions to the service provider node. An adaptive pipeline is constructed within the service provider node according to control parameters contained in the coded instructions sent to it by a user. The adaptive pipeline includes a decode and an encode stage with zero or more intermediate filtering stages. The number and type of intermediate stages is determined by the values of the specified flow parameters.

9 Claims, 2 Drawing Sheets

NETWORK STACK

SYSTEM FOR NETWORK TRANSCODING OF MULTIMEDIA DATA FLOW

STATEMENT REGARDIRG FEDERALLY SPONSORED RESEARCH AND DEVELOPMENT

This invention was made with United States Government support under Award No. 70NANB5H1176 National Institute of Standards and Technology (NIST), Department of Commerce. The United Stats has certain rights in the invention.

BACKGROUND OF THE INVENTION

The present invention relates in general to transcoding, and more particularly to network transcoding of multimedia data flow.

Distributed multimedia applications require communications support mechanisms with multiple clients on a network. Referring to FIG. 1, networking capability of a network node (a computer residing on a network) is divided into several layers that interface with each other. This is called the network stack. Starting from the bottom of the network stack, the physical network interface is responsible for receiving the electronic signals that come across the network wire. Moving up the stack the network signals are decoded further and passed to the next stack until the application layer is reached. It is this layer where the network traffic is interpreted in such a way that a response can be communicated to network clients to satisfy the ultimate service request by that client, such as a request for particular multimedia data flow.

Such network traffic needs to be delivered to end-systems, networks and end-users in a form that they can handle while satisfying the constraints imposed by the application. Quality of Service (QOS) mechanisms that allow full quality multimedia data playout on high-performance stations, while at the same time providing appropriately filtered lower quality playout, perhaps in a different coding format, at other end systems is called transcoding. However, current transcoders cannot scale, cannot adapt and are not flexible.

What is desired is a system for network transcoding of multimedia data flow wherein users can program a transcoding resource across the network and have a custom transcoder, so to speak, that scales, is adaptable and flexible.

SUMMARY OF THE INVENTION

In accordance with the illustrated preferred embodiment of the invention, a service provider node has an active network daemon running on it. Users control an adaptive pipeline via the active network capability of the service provider node by sending coded instructions to the service provider node. After intercepting a network client request for transcoding, an adaptive pipeline is constructed within the service provider node according to control parameters contained in the coded instructions sent to it by a user. The adaptive pipeline includes a decode and an encode stage with zero or more intermediate filtering stages. The number and type of intermediate stages is determined by the values of the specified flow parameters. The multimedia data flow requested by the network client is then processed through the adaptive pipeline and the resulting transcoded multimedia data flow is sent to the network client that requested it.

The objects, advantages, and other novel features of the present invention are apparent from the following detailed description when read in conjunction with the appended claims and attached drawing.

DESCRIPTION OF THE PREFERRED EMBODIMENT

Figure 1:
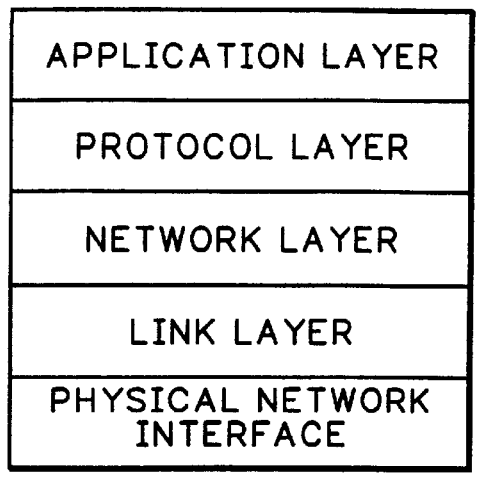
FIG. 1 is a block diagram of the layers of a network stack.

Referring to FIG. 1, the present invention operates at the application layer of the network stack, and therefore no change is required in current network protocols such as IP (Internet Protocol), and standardized packet format and addressing schemes are used.

Figure 2:
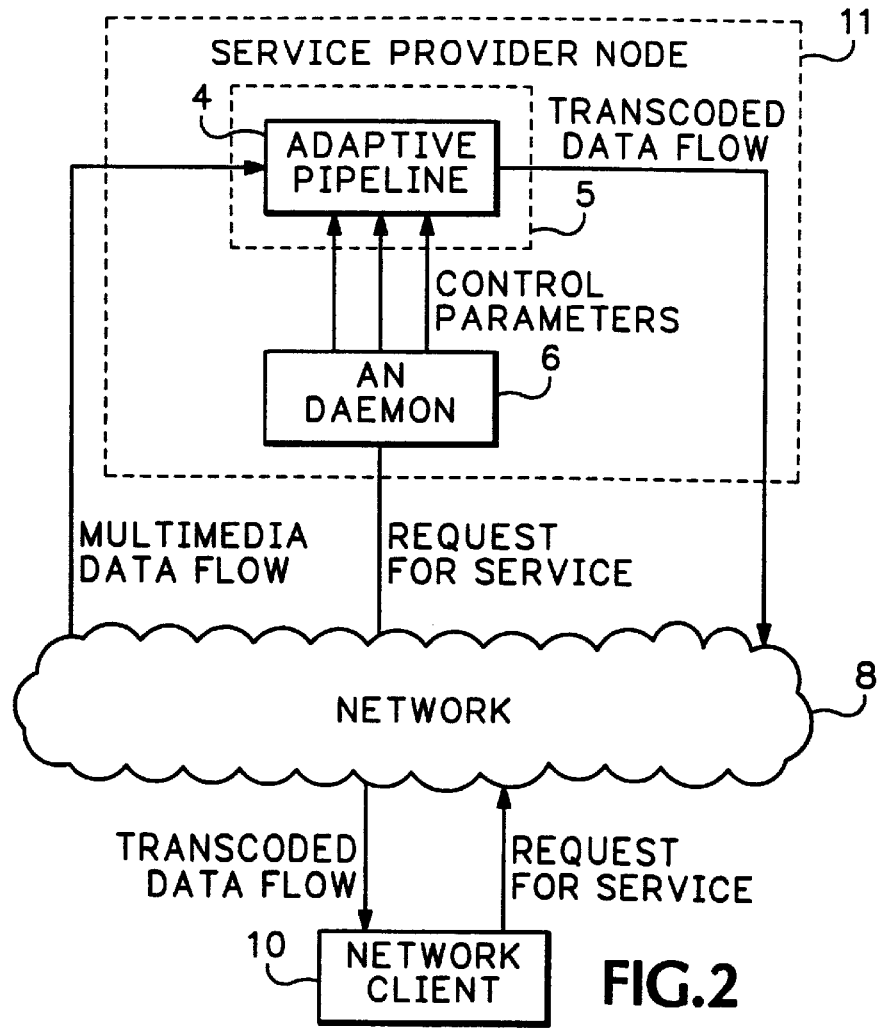
FIG. 2 is a block diagram of a system for network transcoding according to the present invention.

Referring to FIG. 2, a network client 10 launches a request for service over a network 8. A service provider node 11 residing on the network 8 has a program running called an active network (AN) daemon 6. The AN daemon 6 provides a programmable open node so that network users may deploy programs dynamically into node engines. The service provider 11 intercepts the request and the AN daemon 6 forks a child process 5 corresponding to the service requested from a plurality of services that may be available. According to the present invention the service that is requested is transcoding. The AN daemon 6 then parses the request for service and loads specific control parameters specified in the request for service into a data structure. The control parameters are specified by a network user and include, but are not limited to:

1. Command Type (e.g. Connection request)
2. Ports (channel identifications)
3. Media Type
4. Bit-Rate
5. Frame Rate
6. Resolution
7. End-to-End Latency
8. Interlace
9. Signature
10. Loss Percentage
11. Content Identification
12. Code Type
13. Filter
14. Filter Parameter
15. Prediction
16. Hostname The relationship between a parent and child process is such that the parent process (AN daemon 6) and the child process 5 are running concurrently within the network node 11 and therefore may communicate with each other through parameters.

Figure 3:
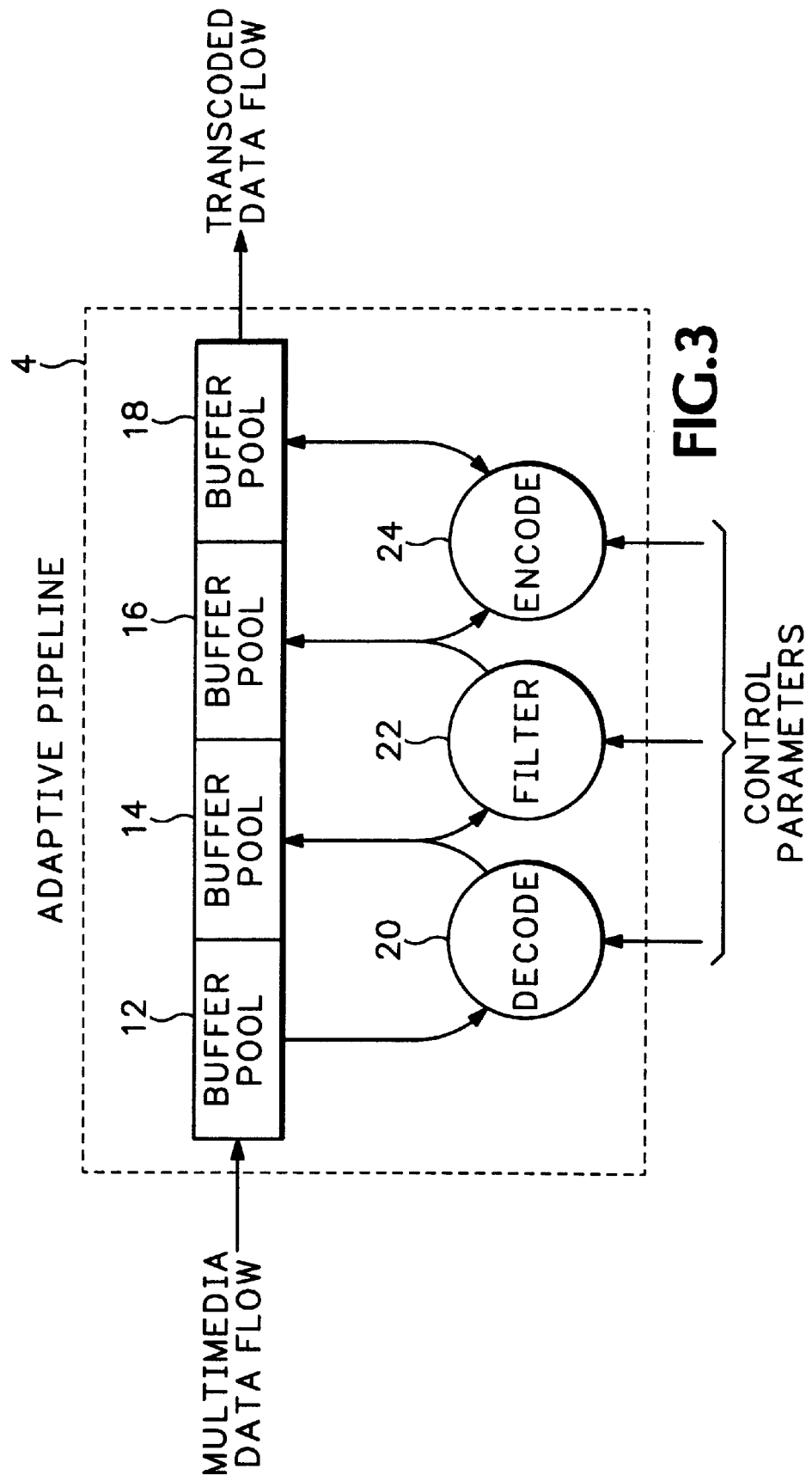
FIG. 3 is a block diagram of an adaptive pipeline according to the present invention.

The child process 5 hosts an adaptive pipeline 4 in order to provide transcoding service. Referring to FIG. 3, an adaptive pipeline 4 is a set of modular components, each component implementing one transformation to a data stream. The data stream in the preferred embodiment is multimedia data flow being sent to the service provider node 11, such as Moving Picture Experts Group standards 1–4 (MPEG-1, MPEG-2, MPEG-4), Joint Photographic Experts Group (JPEG), H.263, H.261, but is not limited to those standards. The head end stage of the pipeline 4 is a decoder engine 20 for the particular standard requested for transcoding, while the tail end is an encoder engine 24 for the particular standard requested to be the result of the transcoding. The intermediate stages 22 are those that allow adjusting of the quality of baseband multimedia data flow in order to transcode the data flow. These include, but are not limited to: horizontal filtering, vertical filtering, mosquito filtering and adaptive interpolation. Buffer pools 12, 14, 16, 18 fulfill the memory requirements of the particular stages of the adaptive pipeline 4.

Referring to FIG. 2, The AN daemon 6 passes the control parameters to the adaptive pipeline 4 by passing the data structure containing the control parameters to the child process 5 hosting the adaptive pipeline 4. Referring to FIG. 3 the adaptive pipeline is configured according to the control parameters. The child process calls action functions to perform the decode 20, filter 22 or encode 24 stage of the adaptive pipeline 4 and these in turn select an appropriate function to transcode the multimedia data flow requested by the network client 10 according to the encode or decode code type and the other configurations specified by the control parameters. This allows the pipeline 4 itself and individual stages of the pipeline to be configurable across the network by users specifying values of flow parameters.

The intermediate stage(s) 22 of the pipeline 4 however, are optional and there could be more than one intermediate stage. The intermediate stage(s) 22 are a function of the amount of filtering desired, which is specified in the flow parameters mentioned above. On the simple side, an MPEG-2 to H.263 transcoding requires at least horizontal and vertical filtering in the intermediate stages 22. On the more complex side, the filtering could be so exhaustive that certain combinations would not fit in a stage, and therefore combinations are split into multiple intermediate stages 22. For example, if adaptive interpolation is a type of filtering requested, and horizontal/vertical filtering are still required, the choice is to add another stage. Which combinations fit into a stage and in what order is active-node intelligence captured in tables. If a user requests a large amount of filtering it results in multistage filtering, and therefore more end-to-end latency. This is not desired for video conferencing but is perhaps acceptable for just browsing. For real-time interaction, like in video conferencing, it is desirable to request an amount of filtering that requires either just one, or no stage at all. The significance of the one filtering stage is that it can serve as a synchronization port as well.

The Node Operating System (NodeOS) of the service provider node 11 according to the preferred embodiment is an off-the-shelf real-time operating system REACT, an extension of the IRIX operating system provided by SGI, Inc., but any other real-time NodeOS may be used which has the following general characteristics. REACT NodeOS provides interface for activity/thread mapping and support for real-time frame-based scheduling and related context switching. A nominal period of a few milliseconds is set, with programming for phantom frame injection. This results in elastic behavior of the frame boundary, which is a desirable property of soft real-time applications, especially when the same set of resources are being shared by multiple sessions. This particular NodeOS provides limited monitoring facilities that the adaptive pipeline 4 may use for adaptive behavior. Overrun (crossing stipulated frame boundary) condition is the most common monitor used. NodeOS also provides system calls to administer resource usage. This input is used by an admission-control engine to limit new channel buildup.

Referring to FIG. 2, the transcoded data flow resulting from the process of the adaptive pipeline 4 is then sent over the network 8 to the network client 10 that requested it. The data is consistent with the format requested by the network client 10 according to the flow parameters in the request for service.

Thus, the present invention provides a system for network transcoding of multimedia data flow wherein users program a transcoding resource across the network and have a custom transcoder, so to speak, that scales, is adaptable and flexible.

What is claimed is:

1. A method for network transcoding of multimedia data flow comprising the steps of:

receiving from a network client by an active network daemon a request for service containing flow parameters;

decoding multimedia data flow requested by the request for service in a way determined by the flow parameters in the request for service;

encoding the decoded multimedia data flow in a way determined by the flow parameters in the request for service, thereby producing transcoded multimedia data flow; and transmitting the transcoded multimedia data flow to the network client.

2. A method for network transcoding of multimedia data flow according to claim 1 further comprising, after the decoding step, the step of filtering the decoded multimedia data flow in a way determined by the flow parameters in the request for service, the filtered decoded multimedia dataflow being input to the encoding step.

3. A method for network transcoding of multimedia data flow according to claim 1 or 2 wherein the flow parameters indicate at least one of the following: command type, ports, media type, bit-rate, frame rate, resolution, end-to-end latency, interlace, signature, loss percentage, content identification, code type, filter, filter parameter, prediction, hostname.

4. An apparatus for network transcoding of multimedia data flow comprising:

means for receiving from a network client by an active network daemon a request for service containing flow parameters;

means for decoding multimedia data flow requested by the request for service in a way determined by the flow parameters in the request for service;

means for encoding the decoded multimedia data flow in a way determined by the flow parameters in the request for service, thereby producing transcoded multimedia data flow; and means for transmitting the transcoded multimedia data flow to the network client.

5. An apparatus for network transcoding of multimedia data flow according to claim 4 further comprising means for filtering the decoded multimedia data flow in a way determined by the flow parameters in the request for service, if any filtering is desired as indicated by the flow parameters.

6. An apparatus for network transcoding of multimedia data flow according to claim 4 or 5 wherein the flow parameters indicate at least one of the following: command type, ports, media type, bit-rate, frame rate, resolution, end-to-end latency, interlace, signature, loss percentage, content identification, code type, filter, filter parameter, prediction, hostname.

7. An apparatus for network transcoding of multimedia data flow comprising:

a service provider node having an active network daemon capable of receiving a request for service containing flow parameters from network clients;

an adaptive pipeline to transcode multimedia data flow in a way determined by the flow parameters in the request for service.

8. An apparatus for network transcoding of multimedia data flow according to claim 7 wherein the adaptive pipeline comprises:

a decoder within the service provider node adapted to decode multimedia data flow requested by the request for service in a way determined by the flow parameters in the request for service;

a filter coupled to the decoder, adapted to filter multimedia data flow in a way determined by the flow parameters in the request for service, if any filtering is desired as indicated by the flow parameters;

an encoder coupled to the filter, adapted to encode the decoded multimedia data flow in a way determined by the flow parameters in the request for service thereby producing transcoded multimedia data flow; and means for transmitting the transcoded multimedia data flow to the network client.

9. An apparatus for network transcoding of multimedia data flow according to claim 7 or 8 wherein the flow parameters indicate at least one of the following: command type, ports, media type, bit-rate, frame rate, resolution, end-to-end latency, interlace, signature, loss percentage, content identification, code type, filter, filter parameter, prediction, hostname.

* * * * *